3,013,069
2-(SUBSTITUTED-BENZYL)-1,3-PROPANE-
DICARBOXYLIC ACIDS
Raymond G. Wilkinson, Montvale, N.J., and Thomas
L. Fields, Pearl River, N.Y., assignors to American
Cyanamid Company, New York, N.Y., a corporation
of Maine
No Drawing. Filed July 15, 1958, Ser. No. 748,589
2 Claims. (Cl. 260—521)

This invention relates to new organic compounds and more particularly is concerned with novel substituted phenylethanes which may be represented by the following general formula:

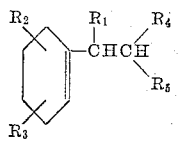

wherein $R_1$ is hydrogen, hydroxy, lower alkyl or a lower alkoxy radical, $R_2$ and $R_3$ are hydrogen, halogen, hydroxy, lower alkyl, lower alkoxy or an aralkoxy radical and $R_4$ and $R_5$ are hydroxymethyl, halomethyl, carboxymethyl, lower alkylsulfonyloxymethyl, aryl-sulfonyloxymethyl, carboalkoxy or cyanomethyl radicals. Suitable lower alkyl and lower alkoxy groups contemplated by the present invention are those having up to about 6 carbon atoms. Suitable aralkoxy groups are benzyloxy, phenthoxy, etc. Suitable arylsulfonyloxy groups are benzenesulfonyloxy and toluenesulfonyloxy. Halogen is exemplified by bromine, chlorine and iodine.

The novel compounds are useful intermediates for the preparation of 2-carboxymethyl and 2-formylmethyl-4-oxo-tetrahydronaphthalenes which form the subject matter of the copending application Raymond G. Wilkinson and Andrew S. Kende, Serial No. 748,613, now abandoned, filed concurrently herewith. The new compounds of this invention are also useful in the synthesis of polyoxygenated cyclic compounds.

The new compounds of this invention may be prepared from the corresponding benzyl bromide according to the following reaction scheme:

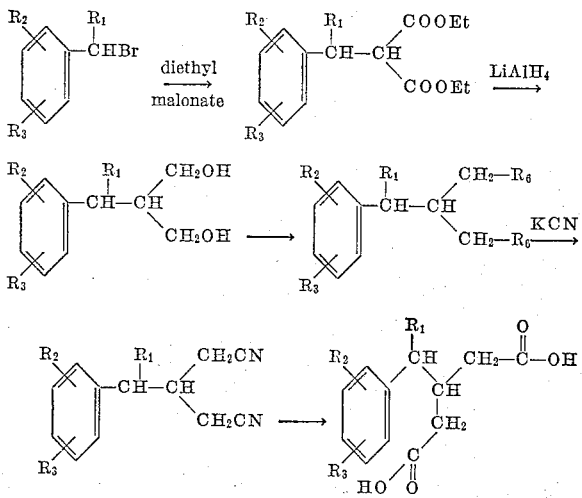

wherein $R_1$, $R_2$ and $R_3$ are as hereinbefore defined, and $R_6$ is chlorine, bromine, iodine, lower alkylsulfonyloxy or an arylsulfonyloxy radical.

The reaction conditions are not especially critical. The reaction of the benzyl bromide with diethyl malonate salt is preferably carried out in a refluxing solution of a lower alkanol. The benzyl malonic ester so formed is reduced with lithium aluminum hydride in a conventional manner. The formation of the bis-methanesulfonate with methanesulfonyl chloride is likewise conventional. Alternatively, the bis-halo intermediates may be prepared as shown in the examples which follow. The formation of the dinitrile by reaction with an alkali metal cyanide is also conventional. The hydrolysis of the dinitrile to the final compound, 3-benzylglutaric acid, is preferably accomplished in a refluxing solution of base, e.g., an alkali metal hydroxide.

The invention will be described in greater detail in conjunction with the following specific examples.

*Example 1*

94.0 grams (0.6 mole) of 2-chloro-5-methoxytoluene [Peratoner and Condorelli, Gazz. Chim. Ital. 28, I, 213 (1898)] are added to 600 milliliters of reagent grade carbon tetrachloride, 117.4 grams (0.66 mole) of N-bromosuccinimide and 0.1 gram benzoyl peroxide. The reaction mixture is stirred at reflux temperature and additional 0.1 gram quantities of benzoyl peroxide are added after 1½ and 18 hours. After 21 hours the volume of solvent is reduced to approximately 250 milliliters and the succinimide filtered off. The filtrate is washed with three 200 milliliter portions of water, dried over anhydrous $MgSO_4$ and filtered. The solvent is removed under reduced pressure and the residual oil crystallized on standing overnight. Yield of crude 2-chloro-5-methoxybenzyl bromide, 131.0 grams. The pure compound crystallizes from (20–40°) petroleum ether as white needles, melting point 55.5–57.5°.

*Analysis.*—Calculated for $C_8H_8OClBr$: C, 40.8; H, 3.42; Cl, 15.07; Br, 33.95. Found: C, 40.59; H, 3.66; Cl, 14.88; Br, 33.97.

*Example 2*

131.0 grams (0.55 mole) of 2-chloro-5-methoxybenzyl bromide in 300 milliliters of absolute ethanol is added over a 1 hour period to a refluxing solution of diethyl malonate (145 grams, 0.9 mole) and sodium methylate (32.4 grams, 0.6 mole) in absolute ethanol. The refluxing is continued for an additional 2½ hours and the reaction mixture concentrated to approximately half volume. The sodium bromide is filtered off and the filtrate acidified by the slow addition of acetic acid. The remainder of the solvent is removed under reduced pressure and the residual oil taken up in ether. The ethereal solution is washed with three 200 milliliter portions of water and dried over anhydrous $MgSO_4$. The ether and excess diethyl malonate are removed under water pump pressure. Diethyl-2-cloro-5-methoxybenzyl-malonate is collected at 155–68°/0.4–0.8 mm.; yield: 90.0 grams; $n_D^{25}$ 1.5030. Overall yield based on 2-chloro-5-methoxy-toluene is 48%.

*Analysis.*—Calculated for $C_{15}H_{19}O_5Cl$: C, 57.2; H, 6.08; Cl, 11.27. Found: C, 57.38; H, 6.32; Cl, 11.09.

*Example 3*

A solution of 105 grams (0.33 mole) of diethyl-2-chloro-5-methoxybenzylmalonate in 360 milliliters of dry ether is added slowly with stirring to 19.5 grams (0.513 mole) of $LiAlH_4$ dissolved in 700 milliliters of dry ether. The mixture is stirred and refluxed for 4½ hours before decomposing the excess hydride with ethyl acetate. The mixture is acidified with 6 N HCl, washed with water, and allowed to stand over 70 milliliters of 5 N NaOH over the weekend. The ether layer is washed with $H_2O$, dried over $MgSO_4$ and concentrated to an almost colorless oil which turns to a mushy solid on seeding. Distillation at 0.1 mm. gives 64 grams (84%) of a colorless oil at 160–175° with a small forerun at 130–160°. On seeding, the main fraction gives white crystals of 2-(2'-chloro-5'-methoxybenzyl)-1,3-propanediol, melting point 41–46°.

*Analysis.*—Calculated for $C_{11}H_{15}O_3Cl$: C, 57.2; H, 6.54; Cl, 15.4. Found: C, 57.53; H, 6.66; Cl, 15.35.

Example 4

A solution of 2-(2'-chloro-5'-methoxybenzyl)-1,3-propanediol (100 grams, 0.435 mole) in 500 milliliters benzene and pyridine (95 grams, 1.2 moles) is cooled to 5°. Methanesulfonylchloride (114 grams, 1.0 mole) is added over a thirty minute period, the temperature of the reaction mixture being maintained between 5–15°. The reaction mixture is stirred at 5° for 16 hours. The precipitated white crystals are collected on a filter and washed thoroughly with five 100 milliliter portions of benzene. The combined washings and filtrate are washed with 250 milliliters 1 N sodium bicarbonate, then with 200 milliliters of water. The benzene layer is treated with decolorizing carbon, dried with anhydrous magnesium sulfate and the volatile solvent removed in vacuo. Yield of crude 2-(2'-chloro-5'-methoxybenzyl) - 1,3 - propanediol-bis-methanesulfonate is 172.3 grams (93.7%). Recrystallization of 148 grams of the crude material from 300 milliliters of n-butanol yields 135.0 grams of white crystals. Melting point, 75–77°.

*Analysis.*—Calculated for $C_{13}H_{19}ClS_2O_7$: C, 40.4; H, 4.95; Cl, 9.19; S, 16.6. Found: C, 40.59; H, 5.09; Cl, 9.03; S, 16.58.

Example 5

A solution of potassium cyanide (47.7 grams, 0.765 mole) in 230 milliliters of water is added to a solution of 2-(2'-chloro - 5' - methoxybenzyl)-1,3-propanediol-bis-methanesulfonate (135.0 grams, 0.348 mole) in 690 milliliters of ethanol. The reaction mixture is refluxed on a steam bath for 4.5 hours, during which time it changes from light yellow to dark green. A 230 milliliter portion of 10 N sodium hydroxide is then added and the refluxing is contined for an additional 16 hours. At the end of this period, the solution has completely lost its green color and is amber. The solution is concentrated to approximately 600 milliliters by distillation at atmospheric pressure and then extracted with three 300 milliliter portions of ether. The aqueous layer is treated with charcoal and filtered, the filtrate cooled to 10° and acidified by the slow addition of 200 milliliters concentrated hydrochloric acid. The while solid which precipitates is collected on a filter and then dissolved in 350 milliliters of 1 N sodium bicarbonate. This yellow solution is slowly poured into 200 milliliters of 6 N hydrochloric acid and the β-(2-chloro-5-methoxybenzyl)-glutaric acid separates as a tan oil which solidifies upon cooling in an ice bath. It is collected on a filter and dried in vacuo over $P_2O_5$. Yield: 69.0 grams (70%); melting point 102–109°. On dissolving a small sample in 15 milliliters of $H_2O$ and 2 milliliters of acetone at the boiling point, filtering and cooling, white crystals are obtained. Melting point 117–118° (uncorr.).

*Analysis.*—Calculated for $C_{13}H_{15}O_5Cl$: C, 54.5; H, 5.27; Cl, 12.37. Found: C, 54.25; H, 5.53; Cl, 12.65.

Example 6

To 1.5 grams (5.0 m mole) of 2-(2'-chloro-5'-methoxybenzyl)-1,3-propanediol in 10 milliliters of benzene is added to 2.20 grams (11.5 m mole) of p-toluenesulfonylchloride. The solution was cooled to 0° and 1.0 milliliter of pyridine added. This mixture is allowed to stand for 4 days at 5° with a considerable amount of pyridine hydrochloride crystallizing out. The solution is filtered and the filtrate is extracted with dilute sodium bicarbonate solution. The benzene layer is concentrated to a gum. This gum can be crystallized from ethanol and water to give white crystals of 2-(2'-chloro-5'-methoxybenzyl)-1,3-propanediol-bis-toluenesulfonate.

*Analysis.*—Calculated for $C_{25}H_{27}O_7S_2Cl$: C, 55.6; H, 5.04; S, 11.9; Cl, 6.58. Found: C, 56.98; H, 5.38; S, 10.32; Cl, 5.75.

The majority of the crude gummy 2-(2'-chloro-5'-methoxybenzyl) - 1,3 - propanediol-bis-toluenesulfonate is reacted in 25 milliliters of ethanol and 5 milliliters of water with 1.0 gram (20 mmoles) of sodium cyanide. After 16 hours refluxing the mixture is concentrated, extracted with ether, the ether removed and the residual oil hydrolyzed with 35 milliliters of ethanol, 3 grams of sodium hydroxide and 2 milliliters of 30% hydrogen peroxide. After 6 hours refluxing, the precipitated brown solid is filtered off, dissolved in water and acidified to give 0.49 grams (34% overall yield) of β-(2-chloro-5-methoxybenzyl)glutaric acid as white crystals, M.P. 108.5–111°.

Example 7

To a solution of 23.06 grams (0.100 mole) of 2-(2'-chloro-5'-methoxybenzyl)-1,3-propanediol in 100 milliliters of dry benzene is added 24.0 milliliters (0.35 mole) of thionyl chloride. This mixture is allowed to stand at room temperature for 18 hours and is then refluxed for 6 hours. Methanol is added slowly to react with the excess thionyl chloride. The reaction mixture is washed with 2 N NaOH until alkaline, then with water until neutral, dried, and concentrated to yield 2-(2'-chloro - 5' - methoxybenzyl) - 1,3 - dichloropropane.

To this crude oil is added a solution of 45 grams (0.34 mole) of NaI in 350 milliliters of acetone. The mixture is refluxed for 5 days with intermittent filtration removing 9.9 grams of NaCl (0.17 mole). The mixture is then concentrated to a mush, water added, and the product extracted with ether. Evaporation of the ether gives an almost black oil from which only small yields of crude product can be obtained by crystallization from ethanol. However, evaporative distillation at 0.1 mm. gives a yellow forerun at about 130°, and a yellow gum from 130 to 150°, which crystallizes readily from ethanol to give 16.2 grams of white needles, M.P. 67–69°. Additional material is recovered by redistillation of the forerun and the residues yielding 7.2 grams of material melting from 58 to 68°. Total yield of 2-(2'-chloro-5'-methoxybenzyl)-1,3-diiodopropane 23.4 grams (52%). Recrystallization from ethanol raises the melting point to 68–69.5°.

*Analysis.*—Calculated for $C_{11}H_{13}OClI_2$: C, 29.35; H, 2.92; Cl, 7.88; I, 56.4. Found: C, 29.72; H, 3.12; Cl, 8.23; I, 56.10.

Example 8

To 11.90 grams (26.4 mmoles) of 2-(2'-chloro-5'-methoxybenzyl)-1,3-diiodopropane dissolved in 75 milliliters of 95% ethanol is added 4.9 grams (100 mmoles) of sodium cyanide in 10 milliliters of water. This mixture is refluxed for 20 hours before concentrating under vacuum. Water is added and the oil which separates is extracted with ether. The ether layer after being dried over anhydrous magnesium sulfate is concentrated on the steam bath under an air jet to give 6.1 grams of β-(2-chloro-5-methoxybenzyl)-glutaronitrile as a tan oil. This is dissolved in 55 milliliters of 95% ethanol and 15 milliliters of 10 N sodium hydroxide are added. On refluxing for two hours a considerable amount of white solid separates and is filtered off. The filtrate is refluxed for an additional 20 hours and then diluted with 200 milliliters of absolute alcohol to precipitate more white solid which is filtered off. The combined solids are dissolved in 200 milliliters of water, the solution extracted with ether and then acidified with concentrated hydrochloric acid. A light yellow oil separates and crystallizes on seeding to yield 4.30 grams of white crystals of β-(2-chloro-5-methoxybenzyl)glutaric acid, M.P. 107–115. On recrystallization this compound melts at 116–118° and shows no depression of melting point on mixing with an analytically pure sample.

Example 9

2 - (2' - chloro - 5' - methoxybenzyl) - 1,3 - dibromopropane is prepared from 11.81 grams (51.2 mmoles) of 2 - (2' - chloro - 5' - methoxybenzyl) - 1,3 - propanediol in 25 milliliters of reagent benzene by the addition of 2.4 milliliters (25.2 mmoles) of phosphorus tribromide and one drop of pyridine and refluxing the mixture for 40 minutes. The benzene solution is washed with water, dried over anhydrous magnesium sulfate and concentrated to yield 2-(2'-chloro-5'-methoxybenzyl)-1,3-dibromopropane.

*Example 10*

β-(2-chloro-5-methoxybenzyl)glutaronitrile is prepared from 6.6 grams (1.85 mmoles) of crude 2-(2'-chloro-5'-methoxybenzyl)-1,3-dibromopropane in 15 milliliters of absolute ethanol by adding 3.5 grams (70 mmoles) of sodium cyanide in 6 milliliters of water and refluxing the mixture for 18 hours. The ethanol is removed and the yellow oil which separates is taken up in ether. After washing the ether solution with water, drying over anhydrous magnesium sulfate and concentrating the yellow oily residue is, in part, distilled at 0.3 mm. with a colorless oil coming over at 120–130°.

*Analysis.*—Calculated for $C_{12}H_{14}O_2NCl$: C, 60.1; H, 5.88; N, 5.85; Cl, 14.80. Found: C, 62.49; H, 6.33; N, 5.64; Cl, 15.20.

The infrared absorption spectrum shows the characteristic nitrile absorption with a double peak at 4.45 and 4.50μ.

The remainder of the crude product is dissolved in 40 milliliters of ethanol containing 10 milliliters of 10 N sodium hydroxide and the mixture refluxed for 3 hours with a white solid depositing. On removing the ethanol and acidifying with hydrochloric acid a heavy yellow oil separates. This is separated, dissolved in 1 N sodium bicarbonate solution and then decolorized with charcoal. Acidification gives a colorless oil which crystallizes on standing. A total of 2.05 grams of white crystals, M.P. 102–114° is filtered off and dried. Recrystallizing 200 milligrams from acetone and water gives white crystals of β-(2-chloro-5-methoxybenzyl)glutaric acid melting at 117–118°.

*Analysis.*—Calculated for $C_{13}H_{15}O_5Cl$: C, 54.4; H, 5.27; Cl, 12.37; N.E., 143.3. Found: C, 54.25; H, 5.53; Cl, 12.65; N.E., 150.

We claim:

1. A compound of the formula:

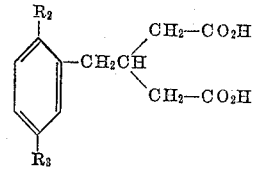

wherein $R_2$ is selected from the group consisting of chlorine, bromine and iodine, and $R_3$ is lower alkoxy.

2. β-(2-chloro-5-methoxybenzyl)glutaric acid.

References Cited in the file of this patent

UNITED STATES PATENTS

| | | |
|---|---|---|
| 2,524,319 | Kharasch | Oct. 3, 1950 |
| 2,654,778 | Burtner | Oct. 6, 1953 |
| 2,788,360 | Westfahl | Apr. 9, 1957 |
| 2,824,120 | Buckley et al. | Feb. 18, 1958 |
| 2,851,486 | Natta et al. | Sept. 9, 1958 |

OTHER REFERENCES

"Beilsteins Handbuch der Organischen Chemie," volume 9 (1926), page 885.